(12) United States Patent
Gundlach

(10) Patent No.: US 12,397,896 B2
(45) Date of Patent: Aug. 26, 2025

(54) ADDITIVE MANUFACTURED AIRCRAFT STRUCTURE WITH REINFORCEMENTS AND METHOD OF MAKING THE SAME

(71) Applicant: RapidFlight Holdings, LLC, Manassas, VA (US)

(72) Inventor: John F. Gundlach, Manassas, VA (US)

(73) Assignee: RapidFlight Holdings, LLC, Manassas, VA (US)

( * ) Notice: Subject to any disclaimer, the term of this patent is extended or adjusted under 35 U.S.C. 154(b) by 152 days.

(21) Appl. No.: 18/098,889

(22) Filed: Jan. 19, 2023

(65) Prior Publication Data

US 2024/0208633 A1 Jun. 27, 2024

Related U.S. Application Data

(60) Provisional application No. 63/434,393, filed on Dec. 21, 2022.

(51) Int. Cl.
*B64C 1/06* (2006.01)
*B33Y 80/00* (2015.01)
*B64F 5/10* (2017.01)

(52) U.S. Cl.
CPC ............. *B64C 1/061* (2013.01); *B33Y 80/00* (2014.12); *B64C 1/069* (2013.01); *B64F 5/10* (2017.01)

(58) Field of Classification Search
CPC ......... B64C 1/061; B64C 1/069; B33Y 80/00; B33Y 10/00; B64F 5/10
See application file for complete search history.

(56) References Cited

U.S. PATENT DOCUMENTS 11,358,305 B2 * 6/2022 Pfaff ..................... E04G 21/12
2013/0108837 A1 5/2013 Blot
(Continued)

FOREIGN PATENT DOCUMENTS

| EP | 1510454 A1 | 3/2005 |
| EP | 3124375 A1 | 2/2017 |
| EP | 3231592 A1 | 10/2017 |

OTHER PUBLICATIONS

International Search Report and Written Opinion, dated Mar. 21, 2024, for International Application No. PCT/ US2023/085036 (13 pages).

*Primary Examiner* — Christopher W Raimund
(74) *Attorney, Agent, or Firm* — Polsinelli PC

(57) ABSTRACT

In accordance with one embodiment of the present disclosure, an additive manufactured airframe structure is described. This airframe structure can include a plurality of additive manufactured airframe segments coupled together along a longitudinal axis of the airframe structure. Each airframe segment can be monolithic and include an outer wall extending from a first end to a second end along the longitudinal axis. A coupling-element receiving channel can extend through the outer wall generally parallel to the longitudinal axis from a first coupling-channel opening at the first end to a second coupling-channel opening at the second end. A torsion-element receiving channel can also extend through the outer wall at a nonzero angle to the longitudinal axis from a first torsion-channel opening at the first end. A torsion reinforcement element can be received within the torsion-element receiving channel of each additive manufactured airframe segment.

17 Claims, 11 Drawing Sheets

(56) References Cited

U.S. PATENT DOCUMENTS

| | | |
|---|---|---|
| 2015/0328846 A1 | 11/2015 | Pook et al. |
| 2017/0361497 A1* | 12/2017 | Crescenti Savall ... B29C 70/745 |
| 2024/0017479 A1* | 1/2024 | Belvisi ................. B29C 64/118 |

\* cited by examiner

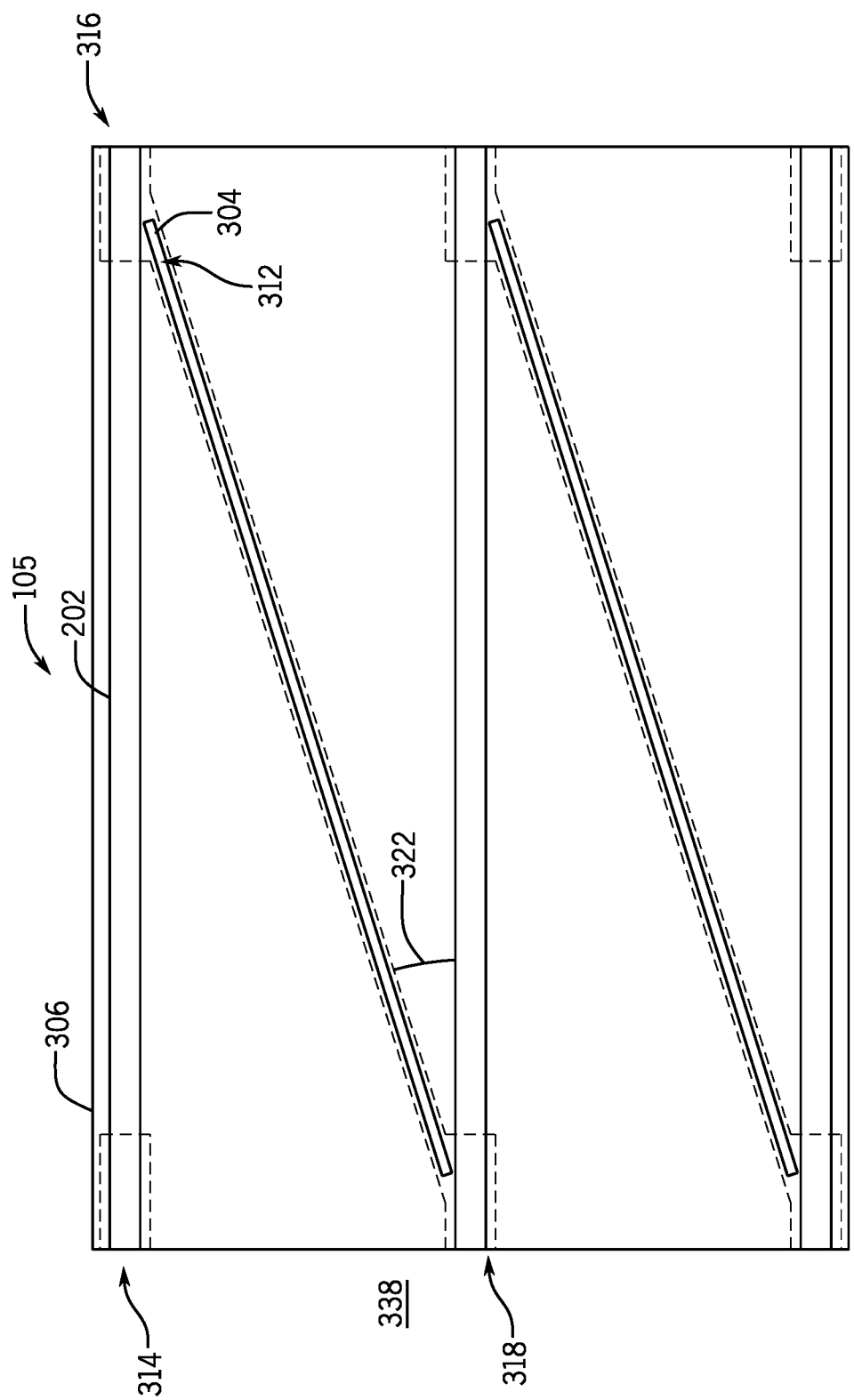

ADDITIVE MANUFACTURED AIRCRAFT STRUCTURE WITH REINFORCEMENTS AND METHOD OF MAKING THE SAME

CROSS-REFERENCE TO RELATED APPLICATIONS

The present application claims the benefit of, and priority to, U.S. Provisional Patent Application No. 63/434,393 filed Dec. 21, 2022 entitled "ADDITIVE MANUFACTURED AIRCRAFT STRUCTURE WITH REINFORCEMENTS AND METHOD OF MAKING THE SAME", the contents of which are hereby incorporated by reference in their entirety.

FIELD

The present disclosure generally pertains to a structure of a vehicle. More specifically, the present disclosure pertains to supporting the structure of an additive manufactured vehicle, such as an aircraft.

BACKGROUND

Additive manufacturing is a manufacturing process that sequentially adds or "prints" thin layers of material on top of each other to form an object. Additive manufacturing of an object, including a part for a structure, is desirable as it provides the ability to rapidly change out parts and keep the stock of parts low. However, the current technology does not provide for assembling a structure from several components without loss in one or more of the mechanical properties of the structure. Additionally, additive manufactured parts can introduce several drawbacks when utilized in specific industries.

SUMMARY

This summary is provided to introduce a selection of concepts in a simplified form that are further described below in the detailed description. This summary is not intended to identify key features of the claimed subject matter, nor is it intended to be used as an aid in determining the scope of the claimed subject matter.

In accordance with one embodiment of the present disclosure, an additive manufactured airframe structure is described. The additive manufactured airframe structure may comprise a plurality of additive manufactured airframe segments coupled together along a longitudinal axis of the airframe structure, wherein each of the plurality of additive manufactured airframe segments is monolithic and comprises: an outer wall extending from a first end to a second end along the longitudinal axis, wherein the outer wall encloses a hollow interior therewithin; a coupling-element receiving channel extending through the outer wall generally parallel to the longitudinal axis from a first coupling-channel opening at the first end to a second coupling-channel opening at the second end, wherein the coupling-element receiving channel is configured to align with the coupling-element receiving channel of an adjacent one of the plurality of additive manufactured airframe segments; and a torsion-element receiving channel extending through the outer wall at a nonzero angle to the longitudinal axis from a first torsion-channel opening at the first end; a coupling reinforcement element extending through the aligned coupling-element receiving channels of the plurality of additive manufactured airframe segments; and a plurality of torsion reinforcement elements, each torsion reinforcement element extending within the torsion-element receiving channel of a corresponding one of the additive manufactured airframe segments.

In accordance with another embodiment of the present disclosure, a method of assembling an additive manufactured airframe structure is described. The method may comprise: inserting, into a torsion-element receiving channel of each of a plurality of segments of an airframe structure, a torsion reinforcement element, wherein the torsion-element receiving channel extends within an outer wall of the segment at a nonzero angle to a longitudinal axis of the segment; aligning the plurality of segments along the longitudinal axis such that coupling-element receiving channels formed within the outer wall of each segment are aligned, wherein the coupling-element receiving channels extend parallel to the longitudinal axis; and inserting a coupling reinforcement element through the aligned coupling-element receiving channels to assemble the additive manufactured airframe structure.

In any of the embodiments described herein, the first torsion-channel opening may be in fluid communication with the first coupling-channel opening.

In any of the embodiments described herein, the additive manufactured airframe structure may further comprise a tab coupled within the first torsion-channel opening between the torsion reinforcement member and the coupling reinforcement member.

In any of the embodiments described herein, the first torsion-channel opening may be spaced apart from the first coupling-channel opening along the first end of the additive manufactured airframe segment.

In any of the embodiments described herein, each torsion reinforcement element of the plurality of torsion reinforcement elements may include an end, and the end of the torsion reinforcement element may be positioned adjacent to a portion of the coupling reinforcement element.

In any of the embodiments described herein, the coupling-element receiving channel may be a first coupling-element receiving channel and the coupling reinforcement element may be a first coupling reinforcement element, the additive manufactured airframe structure may further comprising: a second coupling-element receiving channel extending through the outer wall generally parallel to the longitudinal axis and spaced apart from the first coupling-element receiving channel; and a second coupling reinforcement element extending through the second coupling-element receiving channel such that the second coupling reinforcement element is substantially parallel with the first coupling reinforcement element.

In any of the embodiments described herein, at least one torsion reinforcement element of the plurality of torsion reinforcement elements may extend within the outer wall between the first coupling reinforcement element and the second reinforcement element.

In any of the embodiments described herein, the torsion reinforcement element may be a carbon fiber rod.

In any of the embodiments described herein, the torsion reinforcement element may be coupled within the torsion-element receiving channel by an adhesive.

In any of the embodiments described herein, the torsion-element receiving channel may include one or more grooves formed along a length of the torsion-element receiving channel, and the adhesive may be disposed along the grooves and an outer surface of the torsion reinforcement element.

In any of the embodiments described herein, the coupling reinforcement element may be coupled within the coupling-element receiving channel by an adhesive.

In any of the embodiments described herein, the coupling-element receiving channel may include one or more grooves formed along a length of the coupling-element receiving channel, and the adhesive may be disposed along the grooves and an outer surface of the coupling reinforcement element.

In any of the embodiments described herein, the plurality of torsion reinforcement elements may be arranged in a spiral pattern along the longitudinal axis of the airframe structure.

In any of the embodiments described herein, the nonzero angle of the torsion-element receiving channel of a first of the plurality of additive manufactured airframe segments may have an opposite sign to the nonzero angle of the torsion-element receiving channel of a second of the plurality of additive manufactured airframe segments.

In any of the embodiments described herein, each of the plurality of additive manufactured airframe segments may further comprise a second torsion-element receiving channel extending from the second end of the outer wall towards the first end at a second nonzero angle to the longitudinal axis, and a respective one of the plurality of torsion reinforcement elements may extend within the second torsion-element receiving channel.

In any of the embodiments described herein, the method may further comprise printing, using an additive manufacturing process, the plurality of segments of the airframe structure.

In any of the embodiments described herein, the method may further comprise inserting a tab between the torsion reinforcement element and the coupling reinforcement element.

In any of the embodiments described herein, the method may further comprise applying an adhesive to an outer surface of the torsion reinforcement element.

In any of the embodiments described herein, the adhesive may be applied to the outer surface of the torsion reinforcement element after the torsion reinforcement element is inserted through the torsion-element receiving channel.

In any of the embodiments described herein, the torsion-element receiving channel may extend from a first torsion-channel opening at a first end of the outer wall to a second torsion-channel opening at a second end of the outer wall, applying the adhesive to the outer surface of the torsion reinforcement element may include applying a pressure differential between the first torsion-channel opening and the second torsion-channel opening, and the pressure differential may distribute the adhesive along the outer surface of the torsion-reinforcement element.

In any of the embodiments described herein, the torsion-element receiving channel may include one or more grooves formed along a length of the torsion-element receiving channel, and the pressure differential distributes the adhesive along the grooves to the outer surface of the torsion reinforcement element.

In any of the embodiments described herein, the method may further comprise applying an adhesive to an outer surface of the coupling reinforcement element.

In any of the embodiments described herein, the adhesive may be applied to the outer surface of the coupling reinforcement element after the coupling reinforcement element is inserted through the aligned coupling-element receiving channels.

In any of the embodiments described herein, the aligned coupling-element receiving channels may extend in fluid communication from a first opening at a first end of the aligned plurality of segments to a second opening at a second end of the aligned plurality of segments, applying the adhesive to the outer surface of the coupling reinforcement element may include applying a pressure differential between the first opening and the second opening, and the pressure differential may distribute the adhesive along the outer surface of the coupling-reinforcement element.

In any of the embodiments described herein, the coupling-element receiving channels may include one or more grooves formed along a length of the coupling-element receiving channels, and the pressure differential may distribute the adhesive along the grooves to the outer surface of the coupling reinforcement element.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative examples, in which the principles of the disclosure are utilized, and the accompanying drawings of which:

FIG. 6B illustrates a schematic top view of a wing segment of FIG. 6A in accordance with one or more embodiments of the present disclosure.

DETAILED DESCRIPTION

Figure 1:
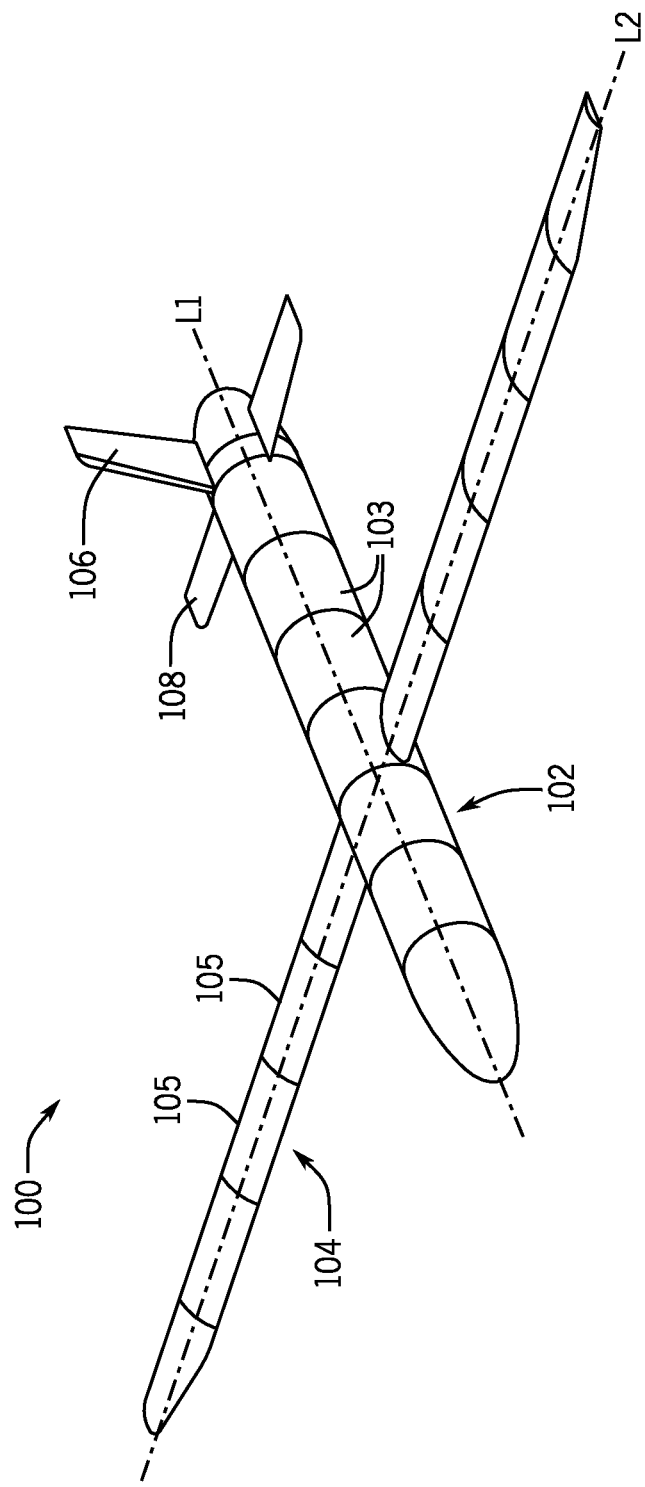
FIG. 1 illustrates a perspective view of an aircraft assembly in accordance with one or more embodiments of the present disclosure.

Utilizing additive manufacturing techniques to manufacture parts for an assembly can have several advantages over conventional manufacturing techniques. Additive manufacturing, for example, allows for more complex designs of a part, minimizes waste, and can lead to faster production times over conventional manufacturing techniques. These advantages can be realized in several industries. For example, a craftsperson can utilize additive manufacturing techniques to manufacture parts for an aircraft. In some situations, the frame, wings, fuselage, payload bays, booms, rotor blades, propellers, landing gear, control surfaces, and other aircraft components can be formed and assembled together using additive manufacturing techniques.

In some applications, parts manufactured using additive techniques can have less desirable mechanical properties when compared to parts manufactured through other techniques. In some instances, these less desirable mechanical properties may be problematic, as these parts can be subjected to several different types of stresses during operation. For example, additive manufactured parts that are used in the fuselage or wings of an aircraft can be subjected to tension, compression, torsion, shearing, and bending stresses. Moreover, the use of larger, heavier parts to compensate for the less desirable mechanical properties would reduce a payload capability of the aircraft.

The present disclosure addresses these and other issues with respect to additive manufactured components, and in particular, additive manufactured components for aircraft. As described in further detail herein, additive manufactured parts of the present disclosure can include one or more receiving channels that extend through the part. Reinforcement elements can be introduced into each of these receiving channels, which can improve the overall mechanical properties of the assembly. The reinforcement elements can be formed from relatively light-weight materials, reducing an effect on the net weight of the aircraft assembly. In some embodiments, the receiving channels can include torsion-element receiving channels formed at a nonzero angle with respect to the longitudinal axis of the assembly. In some of these embodiments, or otherwise, a reinforcing element can be placed within that angled channel, which allows for the assembly to withstand different types of stresses more effectively. For instance, these angled reinforcing elements can improve the fuselage's support against torsional stresses from flight.

The present disclosure also addresses methods to adhere the reinforcement elements to the component within these receiving channels. In some examples, an adhesive can be applied to the reinforcement elements after the reinforcement elements are positioned within their respective channels. To apply the adhesive, a pressure differential can be generated across the receiving channel, which can distribute the adhesive more evenly through the channel and thereby adhere an outer surface of the reinforcement element to the channel. In some of these examples, or otherwise, the receiving channel can be designed in a specific manner to improve adhesive distribution along a length of the receiving channel, which improves adhesion between the reinforcement element and the additive manufactured part. For instance, the receiving channel can include grooves or slots so that the adhesive has a pathway for distribution along the length of the reinforcement element. These and other advantages of the present disclosure will be described in more detail herein.

FIG. 1 illustrates a perspective view of an aircraft assembly 100. The aircraft assembly 100 is a vehicle that can achieve flight for various purposes, such as shipping, transportation, and recreation. The aircraft assembly 100 may be configured for on-board crew or may be an unmanned aerial vehicle. The aircraft assembly 100 can include a fuselage 102 that is coupled to one or more wings 104, a vertical stabilizer 106, and a horizontal stabilizer 108. The fuselage 102 can form the main body of the aircraft assembly 100 and can be used to house a crew, passengers, or cargo. The wings 104 can extend off to one or more sides of the fuselage 102 and can be used to create lift. The vertical stabilizer 106 and the horizontal stabilizer 108 can extend off the rear of the fuselage 102 and can be used to stabilize the aircraft assembly 100 during flight. In addition to these aircraft components, the aircraft assembly 100 can also include other aircraft components that can assist with flight or other operational purposes, including, for example, engines, control surfaces (such as ailerons, flaps, elevators, rudders, etc.), payload bays, booms, propellers, landing gear, frames, avionics, control systems, and communication systems. Although embodiments of the present disclosure are directed to an aircraft assembly 100, these embodiments can be directed to other vehicles, such as cars, helicopters, and watercraft.

Some embodiments of the present disclosure can be directed to an additively manufactured aircraft assembly 100. Notably, the components of the aircraft assembly 100 can be manufactured from an additive manufacturing process and assembled together. For example, the fuselage 102 can be assembled from one or more fuselage segments, such as the fuselage segments 103, which are each manufactured separately by an additive manufacturing process. Similarly, the wings 104 can be assembled from one or more wing segments, such as the wing segments 105, which are each manufactured separately by an additive manufacturing process. This manufacturing process allows for the aircraft assembly 100 to be quickly assembled and also allows for greater customization of the aircraft assembly's 100 design. For example, an additive manufacturing process can allow for the fuselage segments 103, wing segments 105, or other airframe structures to have a more complex design that is integrally formed as a monolithic structure. Additionally, the additive manufacturing process can greatly improve a production rate for manufacturing the components, despite the more complex design. For example, the additively manufactured component (e.g., fuselage segment 103, wing segment 105, vertical stabilizer 106, horizontal stabilizer 108) may be integrally formed with precisely arranged and oriented internal channels, rather than requiring high-precision and expensive machining processes to bore openings and channels after the initial manufacture of the component.

During operation, the aircraft assembly 100 can be subjected to one or more structural stresses. For example, the fuselage 102 can be subjected to torsional stresses as a result of engine torque, aerodynamic forces on the aircraft assembly 100 (e.g., torsional stress created by the action of differential air pressures on the wings 104), or some other manner. In some of these examples, these torsional stresses can subject the fuselage 102 to a twisting force around a longitudinal axis L1 of the fuselage 103 or can subject the wing 104 to a twisting force around a longitudinal axis L2 of the wing 104. The fuselage 102, wing 104, and other components of the aircraft assembly 100 can also be subjected to additional structural stresses, including, for example, tension, compression, shear, and bending stresses.

To improve the aircraft assembly's 100 ability to withstand these stresses, the aircraft assembly 100 can include one or more structural support elements that can reinforce important areas of the aircraft assembly 100. For example, the aircraft assembly 100 can include a coupling reinforcement element 202 and a torsion reinforcement 204 (as shown in FIG. 2).

Figure 2:
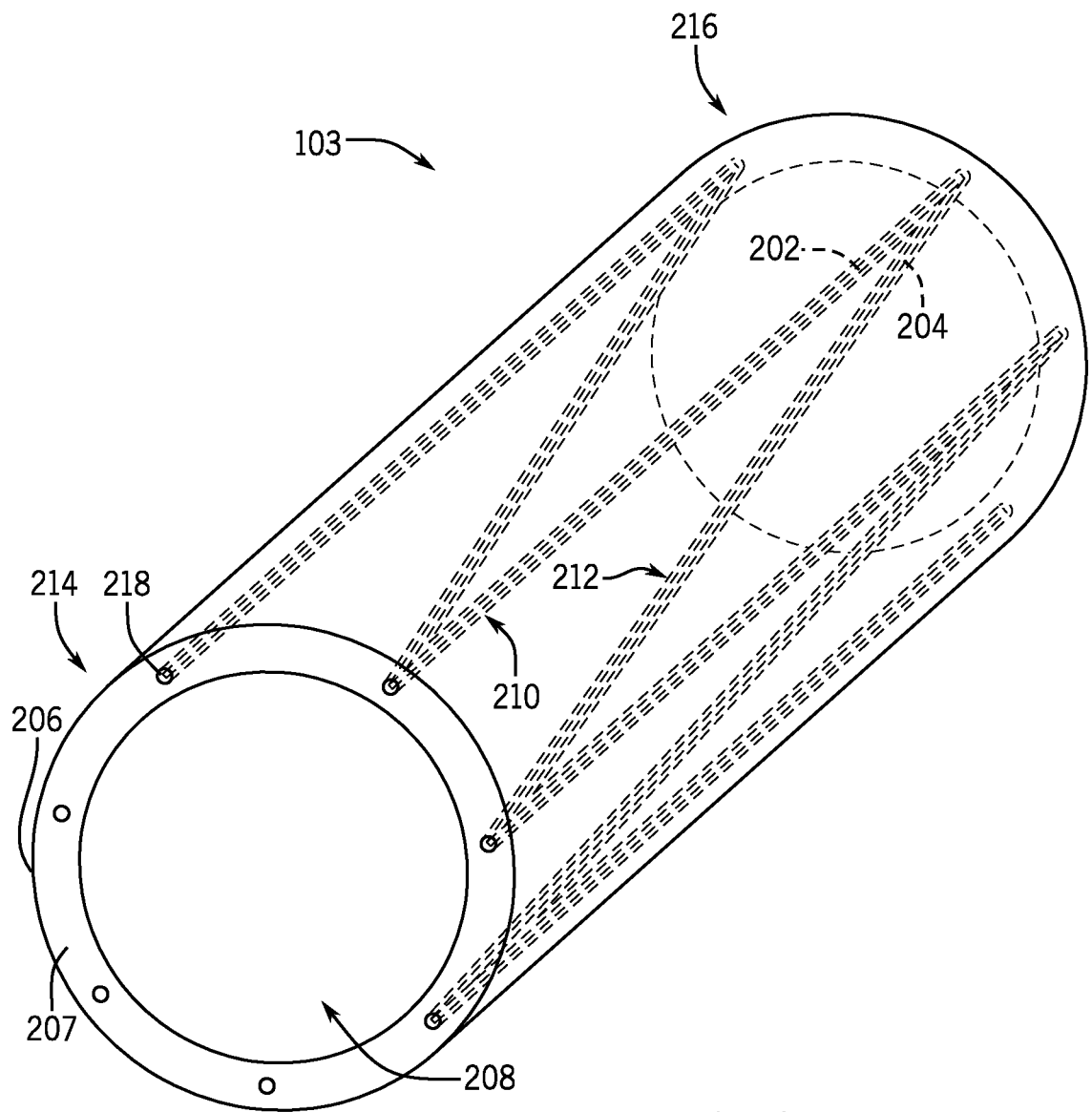
FIG. 2 illustrates a perspective view of a fuselage segment that may be used with the aircraft assembly of FIG. 1 in accordance with one or more embodiments of the present disclosure.

FIG. 2 illustrates a perspective view of a fuselage segment 103. As shown in FIG. 2, the fuselage segment 103 can include an outer wall 206 that forms the outer shell of each fuselage segment. The outer wall 206 can extend circumferentially to enclose a hollow interior 208 within, which can be used to store cargo, payload, other items, or personnel. One or more channels can extend through the outer wall 206 and can receive reinforcement elements therein. These receiving channels may be formed intrinsically within the fuselage segment 103 by leaving empty spaces in the outer wall 206 during the additive manufacture of the segment, thereby reducing a time, tooling expense, and material waste associated with boring channels in an airframe segment after its initial manufacture.

The receiving channels may include one or both of a coupling-element receiving channel 210 and a torsion-element receiving channel 212, which may be configured to receive the coupling reinforcement element 202 and the torsion reinforcement element 204, respectively. The coupling reinforcement element 202 and the torsion reinforcement element 204 can improve the structural integrity of each fuselage segment 103 and of the fuselage 102 as a whole. In some examples, these reinforcements elements (e.g., the coupling reinforcement element 202 and the torsion reinforcement 204) can be elongated structures that can be received within their respective receiving channels. For instance, these reinforcement elements can take the form of a rod (such as a carbon fiber rod, aluminum rod, titanium rod, etc.) or a tube (such as a tube formed from wound carbon fibers or other hollow structure). Other structures and materials that form these reinforcement elements are contemplated.

In addition to improving the structural integrity of the fuselage 102, the coupling-element receiving channels 210 and the coupling reinforcement elements 202 can be used to securely couple one or more fuselage segments 103 together. In the illustrated embodiment, a plurality of coupling-element receiving channels 210 can be spaced circumferentially around the wall 206 of each fuselage segment 103 and can extend from a first end 214 to a second end 216 of the fuselage segment 103. The coupling-element receiving channels 210 of one fuselage segment 103 can align with the coupling-element receiving channels 210 of an adjacent fuselage segment 103. Because the coupling-element receiving channels 210 of one fuselage segment 103 align with the coupling-element receiving channels 210 of an adjacent fuselage segment 103, the coupling reinforcement elements 202 can extend through two or more fuselage segments 103, which can assist with coupling the fuselage segments 103 securely together. In some examples, the coupling-element receiving channels 210 (and, thus, the coupling reinforcement elements 202 received within) can be substantially parallel with the longitudinal axis L1 of the aircraft assembly 100, allowing the use of substantially straight rods or tubes as the coupling reinforcement elements 202.

The coupling reinforcement elements 202 and the torsion reinforcement elements 204 can be used to improve the structural integrity of the fuselage 102 and, in particular, improve the mechanical performance of the fuselage 102 against torsional stresses. In the illustrated embodiment, the plurality of torsion-element receiving channels 212 can each be formed at an angle (e.g., a nonzero angle) with respect to the coupling-element receiving channels 210 and/or the longitudinal axis L1 of the fuselage 102. Stated differently, the torsion-element receiving channels 212 can extend within the outer wall 206 of the fuselage segment 103 at a nonzero angle. Accordingly, when the torsion reinforcement elements 204 are received within the torsion-element receiving channels 212, these torsion reinforcement elements 204 will be positioned at an angle with respect to the coupling reinforcement elements 202 and/or the longitudinal axis L1 of the aircraft assembly 100. This arrangement of the torsion reinforcement elements 204 can improve the structural integrity of the fuselage segments 103, and the fuselage 102 as a whole, against torsional stresses.

Figure 3A:
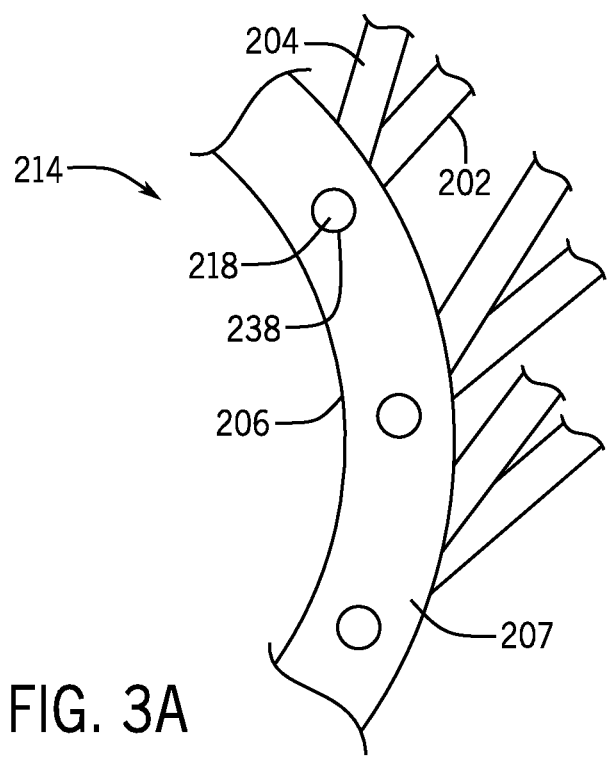
FIG. 3A illustrates a schematic perspective view of an arrangement of receiving channels near an end of an outer wall of the fuselage segment of FIG. 2 in accordance with one or more embodiments of the present disclosure.
Figure 3B:
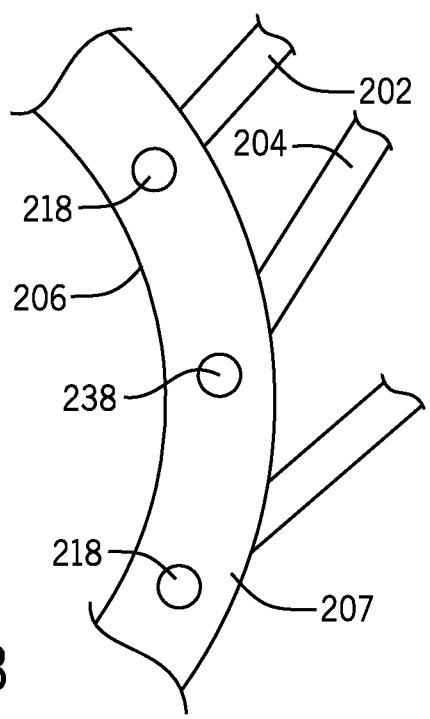
FIG. 3B illustrates a schematic perspective view of an alternative arrangement of receiving channels within an outer wall of the fuselage segment of FIG. 2 in accordance with one or more embodiments of the present disclosure.

FIGS. 3A and 3B illustrate schematic perspective views of different arrangements of the receiving channels 210 and 212 near the first end 214 of the outer wall 206 of the fuselage segment 103. The outer wall 206 (apart from an end face 207 at the end 214) is hidden to better illustrate a positioning and orientation of the receiving channels 210 and 212 in the different embodiments.

Referring to both FIGS. 3A and 3B, the torsion-element receiving channels 212 and the coupling-element receiving channels 210 can be formed at or adjacent the first end 214 of the fuselage segment 103 and can extend towards the second end 216 of the fuselage segment 103. The coupling-element receiving channels 210 can be accessible via a coupling-channel opening 218 formed in the end face 207 at the first end 214, and the torsion-element receiving channels 212 can be accessible via a torsion-channel opening 238 formed in the end face 207 at the first end 214.

In some embodiments, as illustrated in FIG. 3A, the torsion-element receiving channels 212 are in fluid communication with the coupling-element receiving channels 210. For example, as shown in FIG. 3A, the coupling-channel openings 218 are at least partially co-extensive with respective torsion-coupling channels 238. In other words, each shared opening 218, 238 allows a corresponding coupling reinforcement element 202 and torsion reinforcement element 204 to be inserted therethrough. In other embodiments, as illustrated in FIG. 3B, the torsion-element receiving channels 212 can be isolated from flow communication with the coupling-element receiving channels 210. For example, as shown in FIG. 3B, each torsion-channel opening 238 is circumferentially spaced apart along the end face 207 from the adjacent coupling-channel openings 218. In other words, the coupling reinforcement elements 202 and the torsion reinforcement elements 204 are inserted into the outer wall 206 at different locations along the end face 207

It should be understood that the arrangements of the receiving channels 210 and 212 illustrated in FIGS. 3A and 3B are non-limiting, and other arrangements of the receiving channels 210 and 212 are also contemplated. Moreover, although the arrangements are illustrated at the first end 214, similar arrangements may obtain at an end face (not shown) of the second end 216.

Figure 4A:
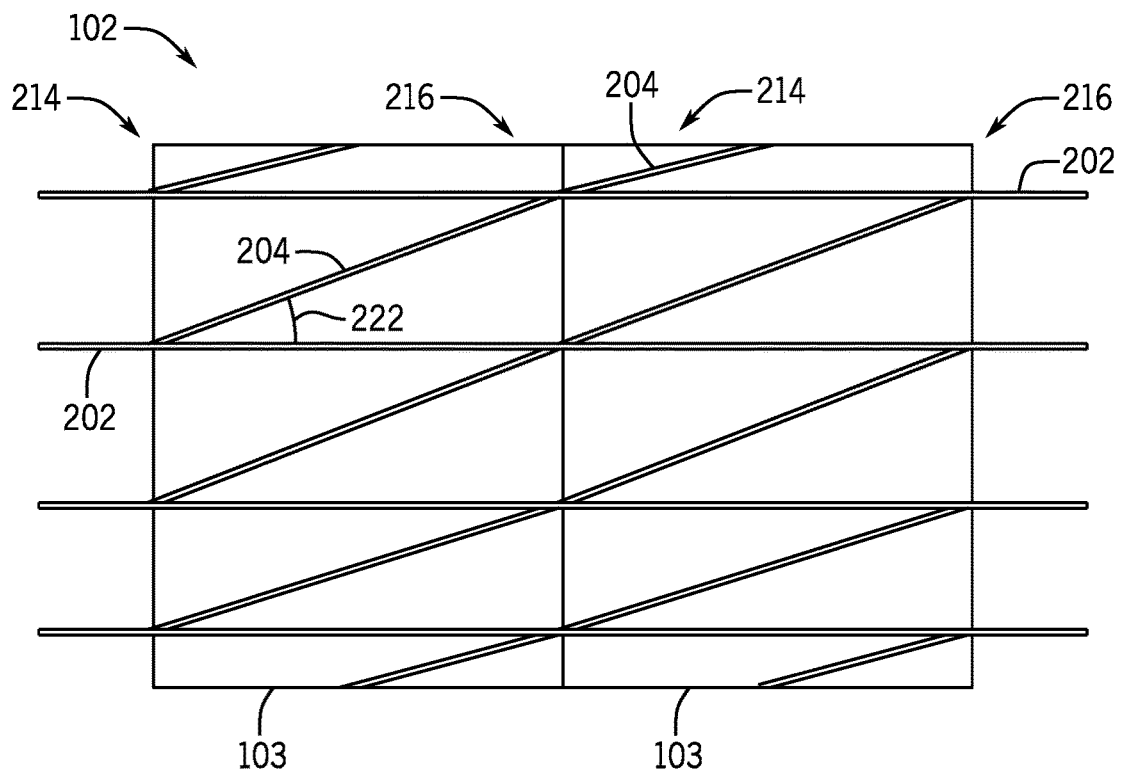
FIGS. 4A-4D illustrate various schematic views of an arrangement of receiving channels along a length of one or more of the fuselage segments of FIG. 2 in accordance with one or more embodiments of the present disclosure.

The orientations and locations of the coupling reinforcement elements 202 and the torsion reinforcement elements 204 within the outer wall 206 can be designed and configured in a variety of manners in order to achieve desired structural properties for the fuselage 102. FIGS. 4A-4D illustrate various example configurations of the coupling reinforcement elements 202 and the torsion reinforcement elements 204 within one or more fuselage segments 103. As shown in FIG. 4A, each torsion reinforcement element 204 can extend from one end (e.g., the first end 214 or the second end 216) of the fuselage segment 103 to the other end (e.g., the second end 216 or the first end 214) of the fuselage segment 103. Each torsion reinforcement element 204 extends within the outer wall 206 between a corresponding pair of coupling reinforcement elements 202. This arrangement avoids interference between the torsion reinforcement element 204 and the adjacent coupling reinforcement elements 202 when the coupling reinforcement elements 204 are inserted into the outer wall 206.

In the illustrated embodiment, each torsion-element receiving channel 212 is oriented at an angle 222 with respect to the longitudinal axis L1. In some examples, each torsion-element receiving channel 212 is oriented at the same angle 222. In other examples, the angle 222 varies within different fuselage segments 103, for different torsion-element receiving channels 212 in the same fuselage segment 103, or even along the course of a single torsion-element receiving channel 212. Moreover, a number and placement of the receiving channels 210 and 212 can vary. For instance, both the coupling-element receiving channels 210 and the torsion-element receiving channels 212 are more densely packed around a circumference of the outer wall 206 in the example of FIG. 4A, as compared to the example of FIG. 4B, and the angle 222 between the torsion-element receiving channels 212 and the longitudinal axis L1 is correspondingly larger in FIG. 4B. In various embodiments, the angle 222 between the torsion-element receiving channel 212 and the longitudinal axis L1 can have a value between about 15 and about 75 degrees. A flexibility of the material used for the torsion reinforcement element 204 may be a factor in the selection of the angle 222 (or vice versa). For example, as the angle 222 increases, an amount of bending imposed upon the inserted torsion reinforcement element 204 also increases (because the torsion reinforcement element 204 at any nonzero angle 222 must bend to follow the circumference of the outer wall 206 as the torsion reinforcement element 204 advances in the receiving channel from the first end 214 towards the second end 216).

Figure 4B:
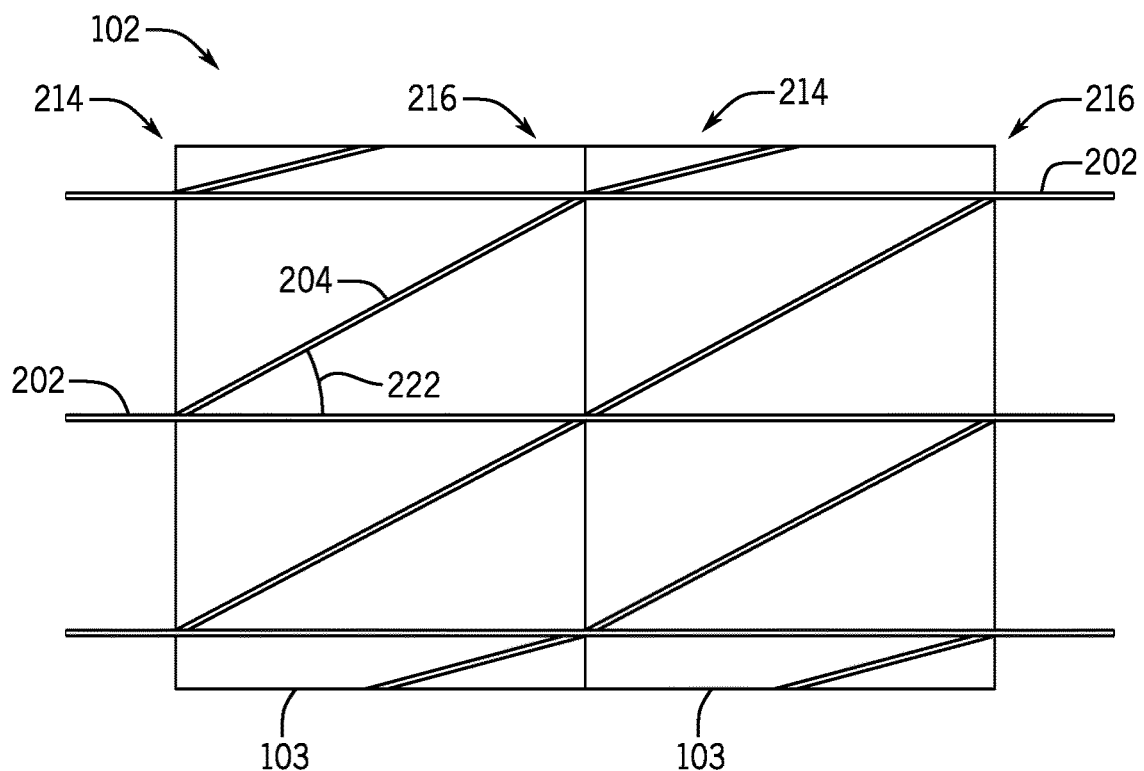

As shown in FIGS. 4A and 4B, the torsion reinforcement elements 204 can form a spiral pattern within the fuselage 102, as the torsion reinforcement elements 204 within one fuselage segment 103 extend at substantially the same direction and angle as the torsion reinforcement elements 204 within an adjacent fuselage segment 103.

Figure 4C:
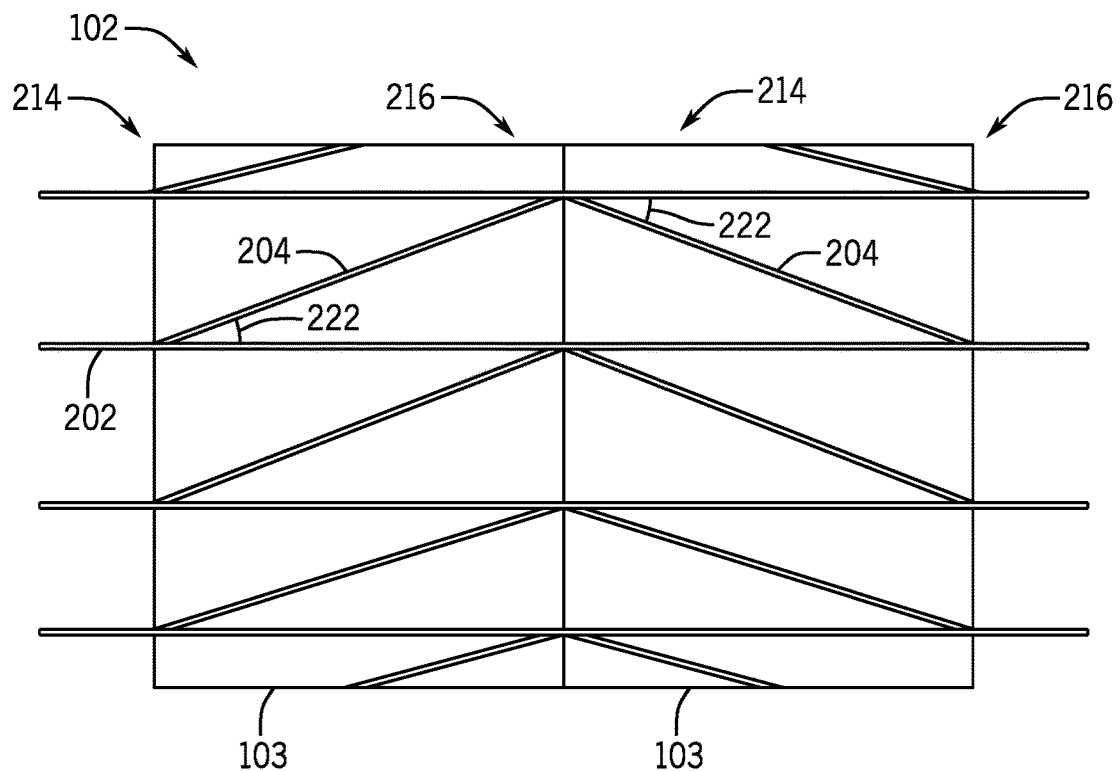

In another example, the torsion reinforcement elements 204 can form an alternating or "zig-zag" pattern. For instance, as illustrated in FIG. 4C, the torsion-element receiving channels 212 of adjacent fuselage segments 103 can be formed at a nonzero angle with opposite signs, so that when the torsion reinforcement elements 204 are received within, these torsion reinforcement elements 204 are also at opposite angles. For example, a first fuselage segment 103 may have torsion-element receiving channels 212 formed at a first angle 222 of 30 degrees and may be adjacent to a second fuselage segment 103 having torsion-element receiving channels 212 formed at a second angle 222 of negative 30 degrees. Alternatively, the angles 222 may have opposite signs and different magnitudes. In some applications, an arrangement of alternating positive and negative angles 222 is beneficial in facilitating symmetric torsion reinforcement of the fuselage 102 as a whole against torsional loads in both directions about the longitudinal axis L1.

Figure 4D:
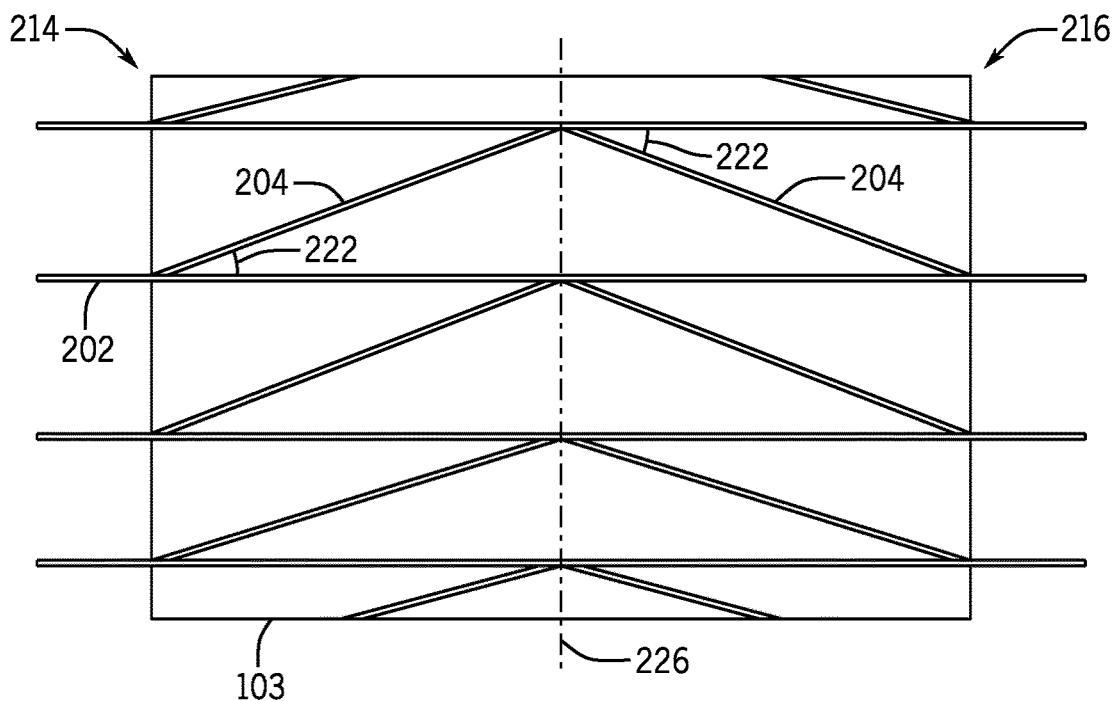

As another example, in the embodiment illustrated in FIG. 4D, a single fuselage segment 103 can include a first set of torsion-element receiving channels 212 that extend from the first end 214 of the fuselage segment 103 to an intermediate portion 226 of the fuselage segment 103, and a second set of torsion-element receiving channels 212 that extend from the second end 216 of the fuselage segment 103 towards the intermediate portion 226. In some such embodiments, the first set of torsion-element receiving channels 212 can be formed at a nonzero angle 222 and the second set of torsion-element receiving channels 212 can be formed at a nonzero angle 222 with opposite sign, so that when the torsion reinforcement elements 204 are received within both sets of receiving channels 212, these torsion reinforcement elements 204 are also at opposite angles. The positive and negative angles 222 may have the same magnitude, or different magnitudes. In some applications, an arrangement of alternating positive and negative angles 222 within a single fuselage segment 103 is beneficial in facilitating symmetric torsion reinforcement of the fuselage segment 103 itself, as well as the fuselage 102 as a whole, against torsional loads in both directions about the longitudinal axis L1.

The fuselage 102 can be configured in other manners besides those illustrated in FIGS. 4A-4D. For example, a portion of the fuselage 102 may be configured in the manner shown in FIG. 4A while a second portion of the fuselage 102 may be configured in the manner shown in FIG. 4C. As another example, a portion of the fuselage 102 may contain no torsion reinforcement elements 204 while a separate portion of the fuselage 102 may include one or more torsion reinforcement elements 204. Other combinations and configurations are contemplated.

Figure 5:
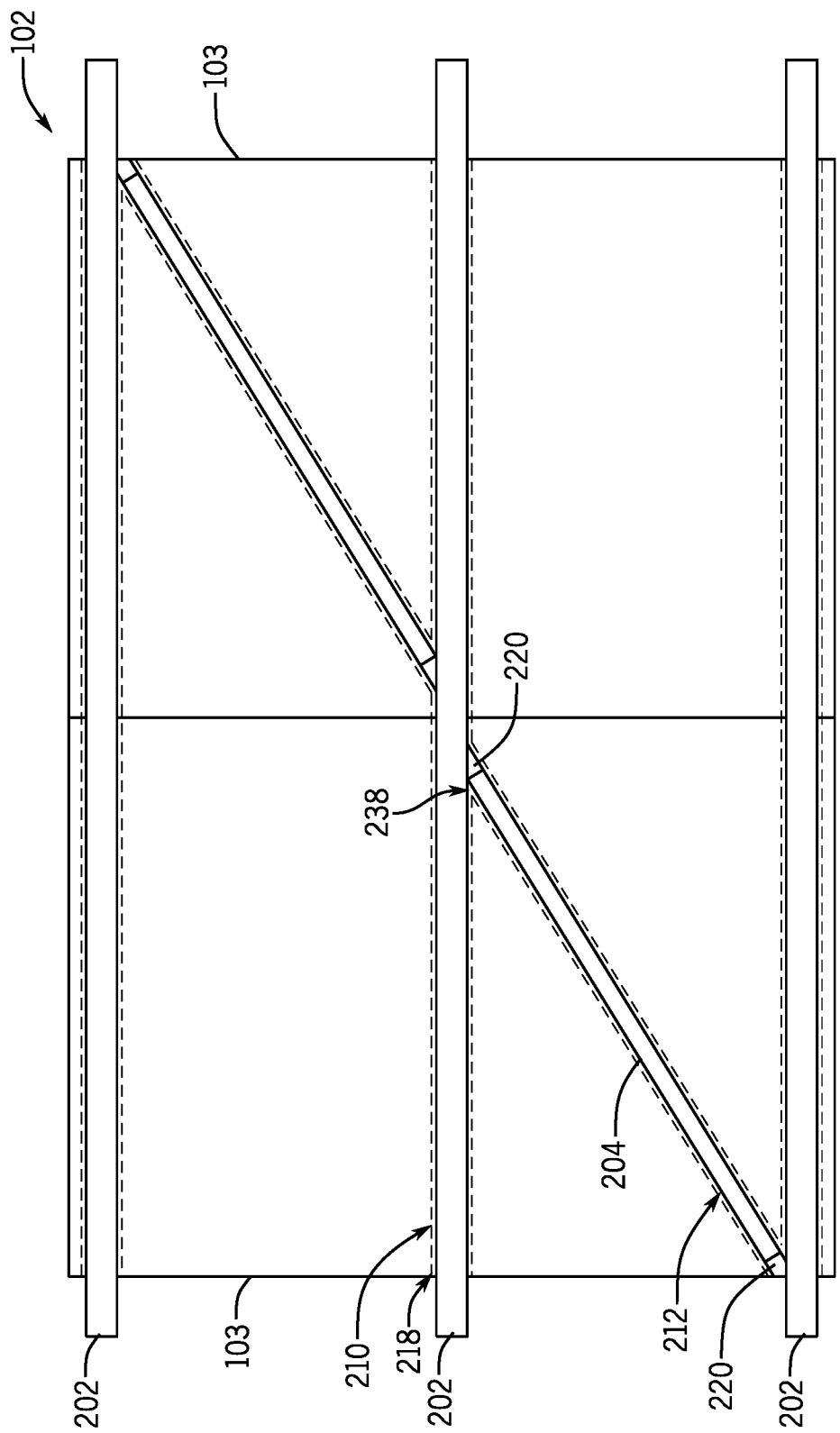
FIG. 5 illustrates a schematic view of two of the fuselage segments of FIG. 2 in an assembled configuration in accordance with one or more embodiments of the present disclosure.

In some examples, the aircraft assembly 100 can include one or more components that assist with securing the torsion reinforcement elements 204 within their respective torsion-element receiving channels 212. For instance, FIG. 5 illustrates a schematic view of torsion reinforcement elements 204 secured within a fuselage segment 103 by tabs 220. As shown in FIG. 5, the tabs 220 can be positioned adjacent to either or both ends of the torsion reinforcement element 204, which can restrict the movement of the torsion reinforcement element 204 within the torsion-element receiving channel 212. The tabs 220 can be coupled to one or both of the fuselage segment 103 and another component (e.g., the coupling reinforcement element 202) so that the tabs 220 block the inserted torsion reinforcement element 204 from sliding back through the torsion-channel openings 238 of the torsion-element receiving channels 212. For instance, the tabs 220 can be coupled within the torsion-channel opening 238 so that the tabs extend at least partially within the torsion-element receiving channel 212. In some examples, the tabs 220 are affixed to the fuselage segment 103 or other component by, for example, an adhesive, fastener, or some other coupling mechanism. Moreover, in some embodiments, the tabs 220 themselves are formed from "blobs" of adhesive.

In some embodiments, one or more of the tabs 220 can be installed within the fuselage segment 103 after the torsion reinforcement element 204 is received within the torsion-element receiving channel 212. By installing at least one tab 220 after the torsion reinforcement element 204 is received within the torsion-element receiving channel 212, the tabs 220 facilitate maintaining the torsion reinforcement element 204 in a non-interfering position during insertion of the coupling reinforcement elements 202. After insertion of the coupling reinforcement elements 202, an adhesive used to secure the tabs 220 may also flow against and adhere to an outer surface of an adjacent coupling reinforcement elements 202 to further secure the torsion reinforcement element 204.

Figure 6A:
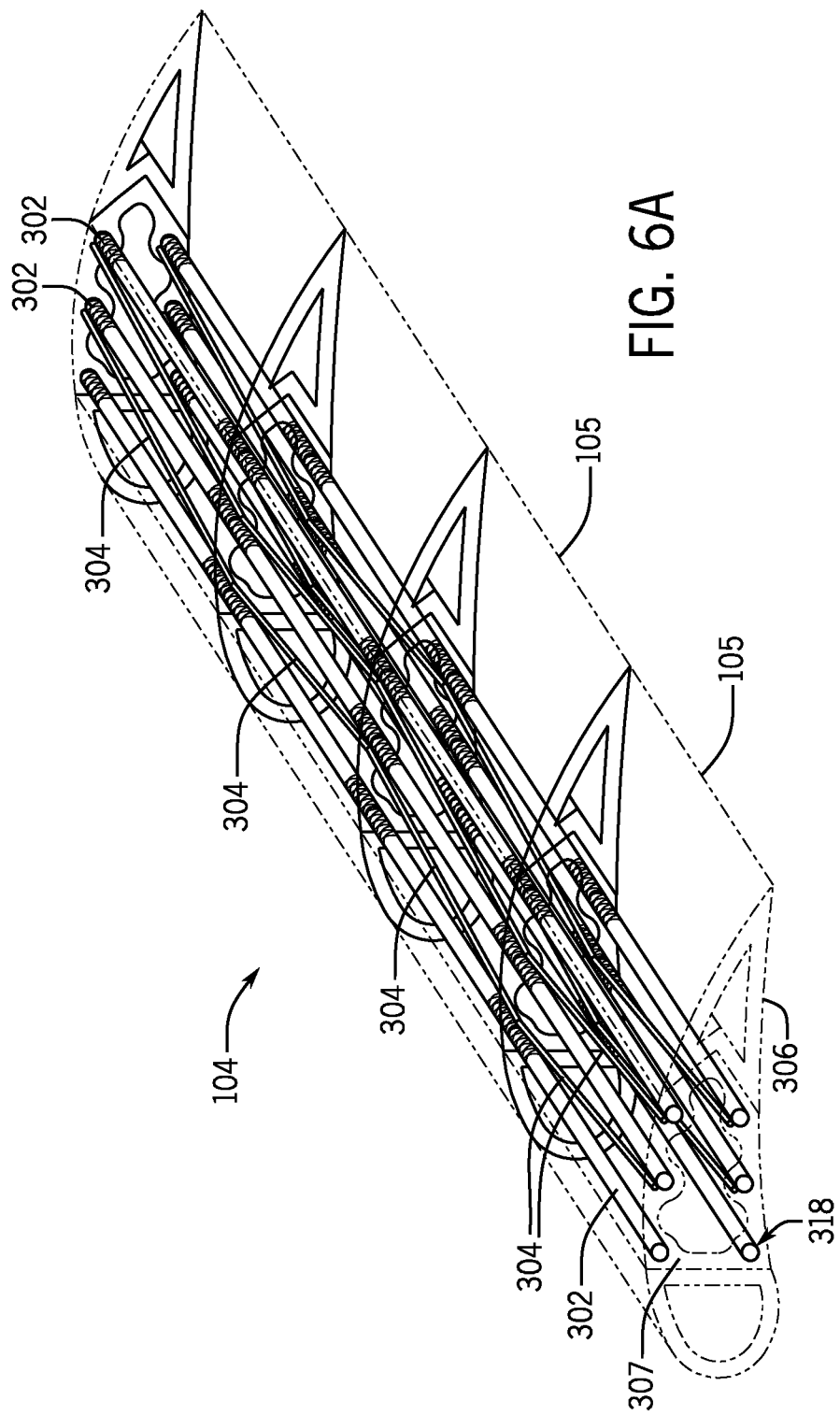
FIG. 6A illustrates a perspective view of a wing that may be used with the aircraft assembly of FIG. 1 in accordance with one or more embodiments of the present disclosure.

As noted above, embodiments of the present disclosure can be directed to other components of an additively manufactured aircraft assembly 100 besides the fuselage 102. For example, the aircraft assembly 100 may include additively manufactured wing segments 105 configured to receive torsion reinforcement elements 204 that function similarly (or identically) as described above. FIG. 6A illustrates a perspective view of a wing 104 including coupling reinforcement elements 202 and torsion reinforcement elements 304 and FIG. 6B illustrates a schematic top view of a wing segment 105 from FIG. 6A. Referring to both FIGS. 6A and 6B, the wing 104 can include two or more wing segments 105 that are coupled together. In particular, each wing segment 105 includes an outer wall 306 and torsion-element receiving channels 312 defined within the outer wall 306, similar to outer wall 206 and receiving channels 212 described above. One or more torsion reinforcement elements 204 can extend within the torsion-element receiving channels 312 between the first and second ends 314, 316 of each wing segment 105 and at a nonzero angle 322 with respect to the longitudinal axis L2 (in this case, the spanwise axis) of the component. The torsion reinforcement elements may be inserted into the outer wall 306 via torsion-channel openings 338 defined in an end face 307 of the outer wall 306.

In some examples, the wing segments 105 can be coupled together by the coupling reinforcement elements 202 that extend through coupling-channel openings 318 in the wing segments 105. The spacing and orientation of the torsion-element receiving channels 312, angles 322, coupling-channel openings 318, torsion-channel openings 338, and/or coupling-channel openings 318 in each wing segment 105 can be similar to that described above with respect to torsion-element receiving channels 212, angles 222, coupling-channel openings 218, torsion-channel openings 238, and/or coupling-channel openings 218. Similar to the torsion reinforcement elements 204 within the fuselage segments 103, the torsion reinforcement elements 204 received within the wing segments 105 can improve the structural integrity of the wing segments 105, and of the wing 104 as a whole, against torsional stresses that are applied to the wing 104 during operation.

Although not illustrated, it is contemplated that other components of the aircraft assembly 100 shown in FIG. 1, such as but not limited to the vertical stabilizer 106 and the horizontal stabilizer 108, can include the torsion reinforcement elements 204 and/or the coupling reinforcement elements 202 received within an outer wall as described above.

In some embodiments, the benefit of reinforcement elements 202 or 204 may not be fully realized if the coupling reinforcement elements 202 and the torsion reinforcement elements 204 are not properly secured (e.g., fixed in place relative to the additively manufactured component) within the coupling-element receiving channels 210 and the torsion-element receiving channels 212, respectively. Therefore, in some embodiments, it may be beneficial for the structural integrity of the aircraft assembly 100 to introduce one or more mechanisms that can secure the coupling reinforcement elements 202 and the torsion reinforcement elements 204 within their respective receiving channels. As previously described, the tabs 220 may assist with securing the torsional reinforcement elements 204 within the torsion-element receiving channels 212. However, other mechanisms and methods may be used in addition to (or in lieu of) the tabs 220.

In some embodiments, the coupling reinforcement elements 202 and the torsional reinforcement elements 204 can be secured within their respective receiving channels with an adhesive. In some applications, better structural performance can result if the reinforcement element is secured to the component along a greater proportion of the reinforcement element's length. However, traditional approaches, such as spreading adhesive over the reinforcement element before insertion, may not be effective in achieving a desired distribution of adhesive over an outer surface of the reinforcement element along its length.

Figure 7A:
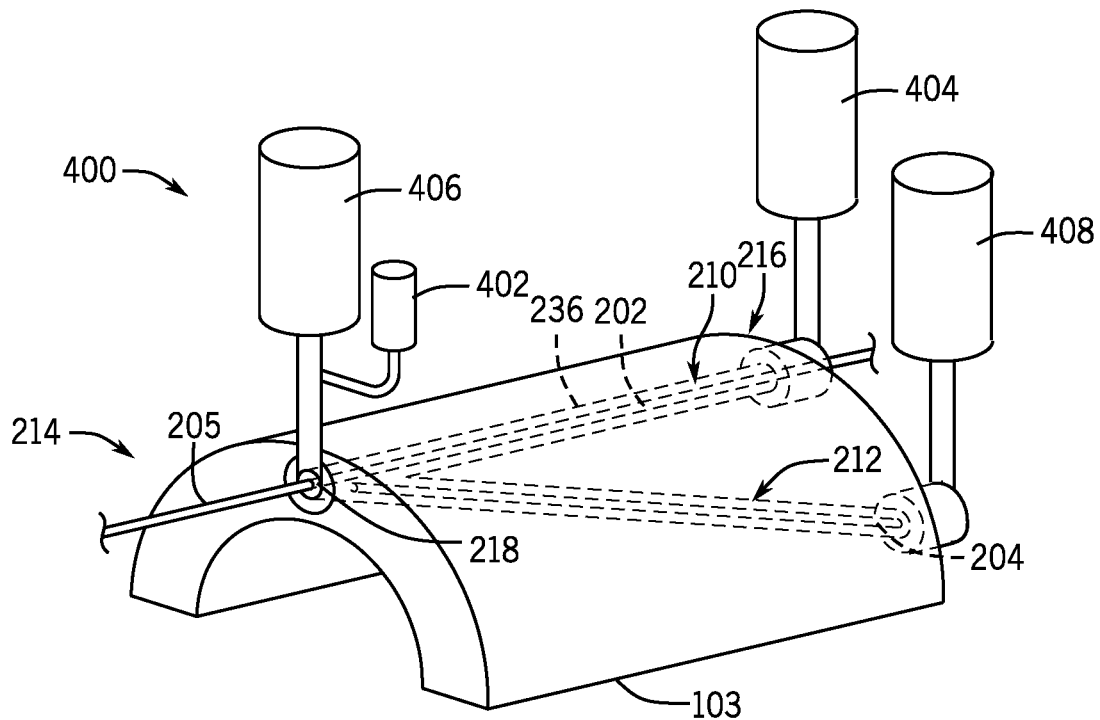
FIGS. 7A and 7B illustrate perspective views of an adhesive application system that may be used in assembling the aircraft assembly of FIG. 1 in accordance with one or more embodiments of the present disclosure.
Figure 7B:
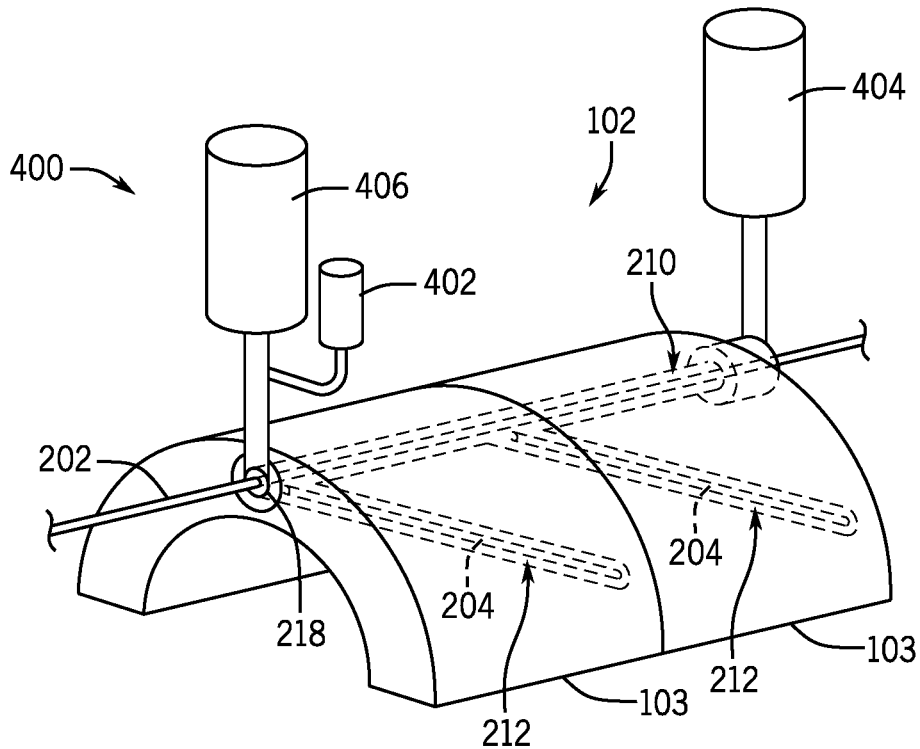
Figure 8A:
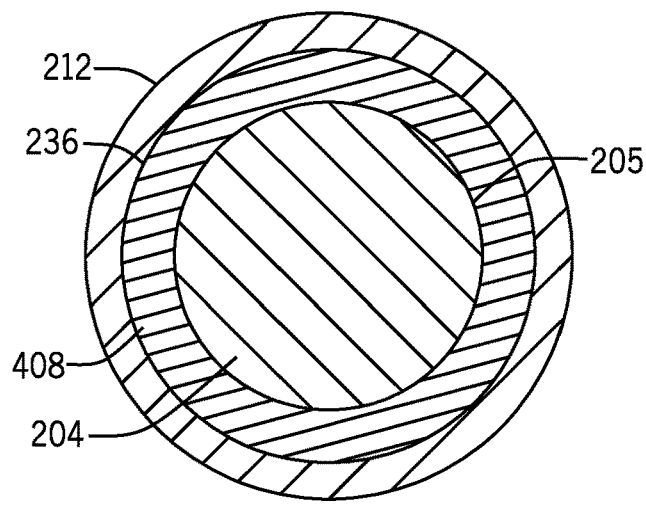
FIG. 8A-8C illustrate cross-sectional views of a receiving channel that may be used in the airframe segments shown in FIGS. 1-7 such in accordance with one or more embodiments of the present disclosure.

The present disclosure includes several approaches to achieving a better adhesive distribution along the length of the reinforcement element. FIG. 7A illustrates an example embodiment of an adhesive application system 400 that is coupled to a single fuselage segment 103 and FIG. 7B illustrates an adhesive application system 400 that is coupled to two or more assembled fuselage segments 103. Although the adhesive application system 400 is illustrated in connection with the fuselage segments 103, it is contemplated that the adhesive application system 400 may also be used with wing segments 105 (shown in FIG. 6A) or other components of the aircraft assembly 100. The adhesive application system 400 can be used to apply and/or distribute an adhesive along a length of the coupling reinforcement elements 202 and the torsional reinforcement elements 204 after they are positioned within the coupling-element receiving channels 210 and the torsional-element receiving channels 212, respectively. As shown in FIG. 7A or 7B, the adhesive application system 400 can include a first adhesive reservoir 402 positioned at the first end 214 of the fuselage segment 103, a second adhesive reservoir 404 positioned at the second end 216 of the fuselage segment 103, and a third adhesive reservoir 408 positioned at the second end 216 of the fuselage segment 103. The first, second, and third adhesive reservoirs 402, 404, 408 can be used to supply or store adhesive within the adhesive application system 400. The adhesive application system 400 can also include a pressure source 406, which can create a pressure differential between the ends of the torsional-element receiving channels 212 of each segment 103, or between the ends of the aligned coupling-element receiving channels 210 of two or more segments 103. With reference also to FIG. 8A, the pressure differential facilitates distribution of the adhesive between the channel walls 236 (which define the respective receiving channels within the outer wall 206 of the fuselage component 103) and an outer surface 205 of the reinforcement element 202 or 204, along substantially an entire length of the outer surface 205. The adhesive can form a bond between the outer surface 205 and the channel walls 236, which affixes the reinforcement elements 202 and 204 within the additive manufactured component.

In some examples, the pressure source 406 can be in fluid communication with the first adhesive reservoir 402, the second adhesive reservoir 404, the third adhesive reservoir 408, and the receiving channels 210 or 212. In some of these examples, or otherwise, the adhesive application system 400 can also include a seal at respective couplings of the first, second, and third adhesive reservoirs 402, 404, 408 to the receiving channel openings 218 or 238 of the fuselage segment, which can help create and maintain the pressure differential as well as help to ensure that adhesive flowing from the reservoirs remains within the receiving channels.

In some embodiments, the adhesive application system 400 is configured to apply adhesive across the torsion-element receiving channels 212 alone. For example, the torsion-element receiving channel 212 can be sealed off from the coupling-element receiving channel 210 and the first adhesive reservoir 402, the second adhesive reservoir 404, the third adhesive reservoir 408, and the pressure source 406 can be fluidly coupled to the torsion-element receiving channel 212 so that adhesive is applied to the torsion-element receiving channel 212. In some of these examples, or otherwise, to provide better access to the torsion-element receiving channels 212, the adhesive can be applied before the coupling reinforcement elements 202 are inserted into the coupling-element receiving channels 210. Additionally, for example, after adhesive has been applied to bond the torsion reinforcement element 204 within the channel 212, the first adhesive reservoir 402, the second adhesive reservoir 404, and the pressure source 406 can be fluidly coupled to the coupling-element receiving channel 210 so that adhesive is applied to the coupling-element receiving channel 210 in a separate process. As shown in FIG. 7B, adhesive can be applied to bond the coupling reinforcement elements 202 within the aligned channels 210 of multiple segments 103 simultaneously. Alternatively, in some examples, the first, second, and third adhesive reservoirs 402, 404, 408 are all fluidly coupled to the coupling-element receiving channel 210 and the torsion-element receiving channel 212 at the same time, such that adhesive can be applied to both channels 210 and 212 simultaneously. In other examples, only some of the first, second, and third adhesive reservoirs 402, 404, 408 are fluidly coupled to the torsion-element receiving channel 212.

Figure 8B:
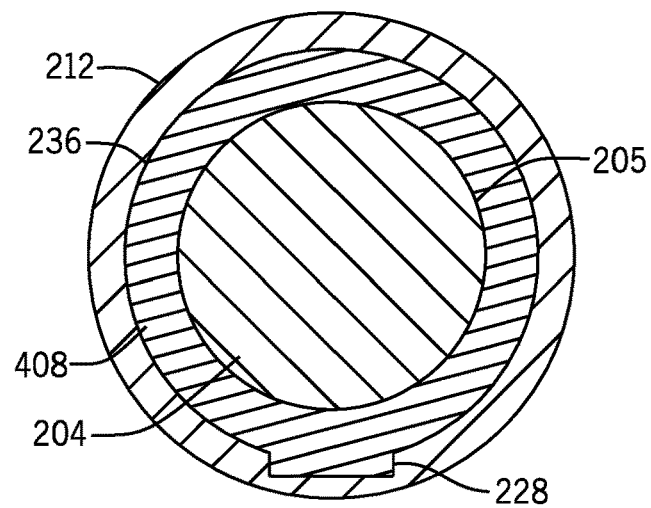
Figure 8C:
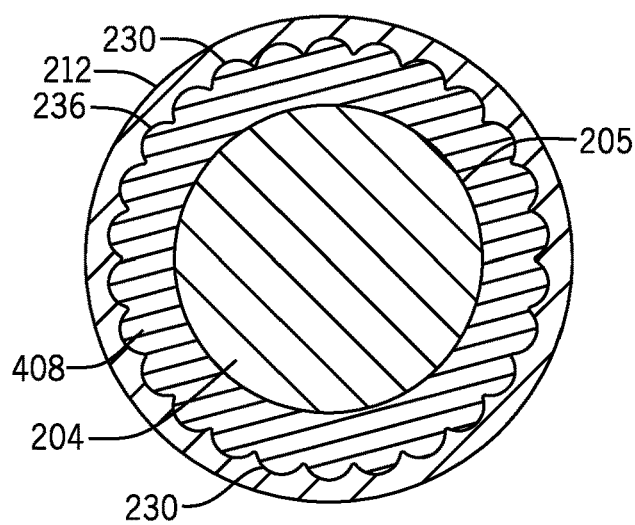

In some examples, the channel walls 236 can be configured to facilitate distribution of the adhesive along the length of the outer surface 205, and to provide a greater surface area to adhere to the adhesive in a more consistent and reliable manner. FIGS. 8A-8C illustrates different example cross-sectional views of the channel wall 236 of a torsion-element receiving channel 212 or, alternatively, a coupling-element receiving channel 210. As shown in FIG. 8A, the channel wall 236 can have a substantially circular cross-section so that the adhesive 408 can uniformly surround the torsion reinforcement element 204 (or the coupling reinforcement element 202). As illustrated in FIG. 8B, a slot-shaped groove 228 can be formed along at least a portion of the length of the channel wall 236. The slot-shaped groove 228 provides a larger flow area for the adhesive 408 to improve an ability of the pressure differential to distribute adhesive along the length of the outer surface 205. In FIG. 8C, multiple grooves 230 can be formed around the chamber wall 236. Similar to the slot-shaped groove 228, these grooves 230 can provide a greater flow area for the adhesive. In addition, the grooves 230 provide an increased surface area of the channel wall 236 around the circumference of the reinforcement element 202 or 204, which improves the bondability between the adhesive 408 and the channel wall 236.

While FIGS. 8A-8C illustrate cross-sectional views if a torsion-element receiving channel 212, configurations of the channel wall 236 other than those illustrated in FIGS. 8A-8C are within the scope of the disclosure.

Figure 9:
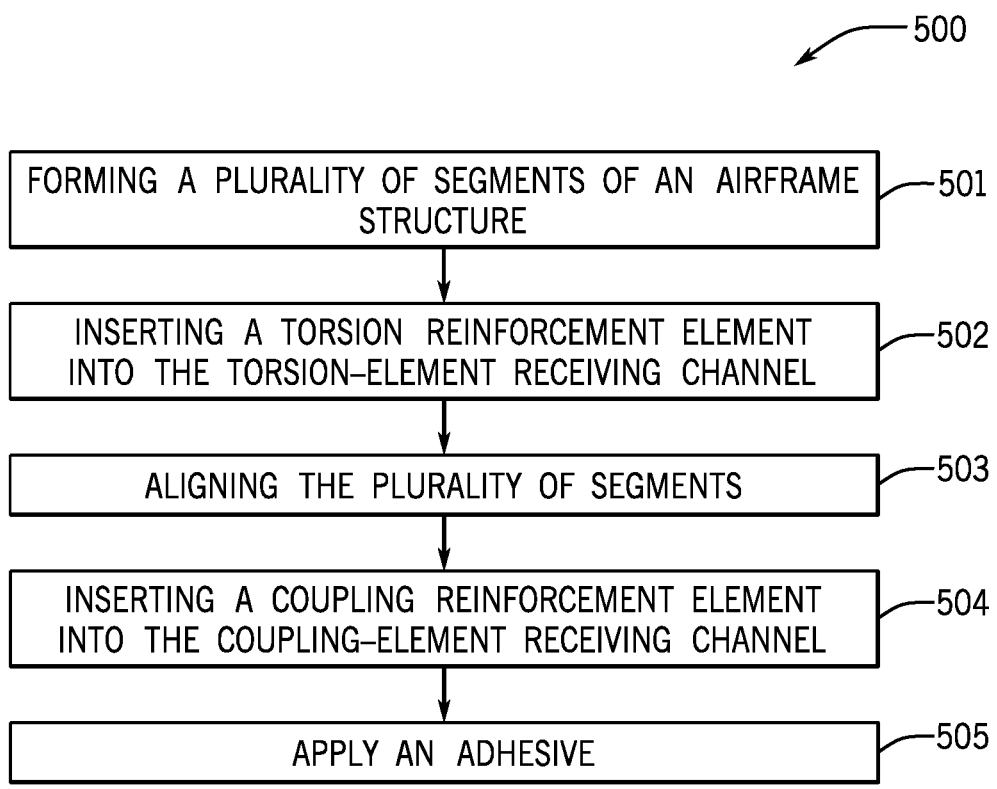
FIG. 9 is a flow diagram illustrating an example method for manufacturing an aircraft structure in accordance with one or more embodiments of the present disclosure.

FIG. 9 is a flow diagram illustrating an example method 500 of assembling an additive manufactured airframe structure. The method 500 can be used to assemble any of the airframe structures described herein, including, for example, embodiments of the fuselage 102 and wings 104.

At step 501, the method 500 begins with forming a plurality of segments of the airframe structure. These segments of the airframe structure can include any segment of an airframe structure, including, for example, one or more fuselage segments (e.g., the fuselage segments 103) that can be assembled together to form the fuselage and one or more wing segments (e.g., the wing segments 105) that can be assembled together to form the wing. In various embodiments, these segments are formed through any desired additive manufacturing process. For example, the plurality of segments can be printed using an extrusion deposition process. In other examples, the plurality of segments of the airframe structure can be formed using other additive manufacturing processes, including, for instance, binder jetting, powder fusion, or other 3D printing or additive process.

At step 502, the method 500 includes inserting a torsion reinforcement element into a torsion-element receiving channel. As previously described with respect to FIGS. 2-6, the segments of the airframe structure (e.g., the fuselage 103) can include one or more torsion-element receiving channels (e.g., the torsion-element receiving channel 212) that can each receive one or more torsion reinforcement elements (e.g., the torsion reinforcement elements 204) within. In some embodiments, the torsion-element receiving channel can extend within an outer wall of the corresponding segment at a nonzero angle to a longitudinal axis of the segment. By extending within the segment in this manner, the torsion reinforcement element can improve the structural integrity of the segment against torsional stresses once inserted into the torsion-element receiving channel.

In some examples, the torsion-element receiving channel can be accessible through a channel opening formed within the segment (e.g., a torsion-channel opening 238), and the torsion reinforcement element can be moved through the channel opening into position within torsion-element receiving channel so that the torsion reinforcement element extends through the torsion-element receiving channel as desired.

In some embodiments, step 502 can further include inserting one or more tabs (e.g., the tab 220) within the segment. The tab can be positioned at an end of the torsion reinforcement element within the torsion-element receiving channel and can be used to retain the torsion reinforcement element within the torsion-element receiving channel. In some examples, the tab can be positioned between the torsion reinforcement element and a separate reinforcement element (e.g., the coupling reinforcement element 202).

At step 503, the method 500 includes aligning the plurality of segments. In some examples, the plurality of segments can be aligned along the longitudinal axis (e.g., the longitudinal axis L1 or L2) of the airframe structure. Additionally, one or more coupling-element receiving channels formed in the plurality of segments can also be aligned (e.g., so that the coupling-element receiving channel of one segment aligns with the coupling-element receiving channel of an adjacent segment). In some instances, when the coupling-element receiving channels are aligned, the coupling-element receiving channel can extend substantially parallel to the longitudinal axis of the airframe structure.

At step 504, the method 500 includes inserting a coupling reinforcement element through the aligned coupling-element receiving channels. In some examples, the coupling-element receiving channel can be accessible through a channel opening formed within the segment, and the coupling reinforcement element can be moved through the channel opening into the coupling-element receiving channel of a first segment, and then into position within the aligned channels of the remaining segments as desired. In some examples, inserting the coupling reinforcement element through the aligned coupling-element receiving channels couples together the plurality of segments forming the airframe structure.

At step 505, the method 500 optionally includes applying an adhesive. In some instances, the adhesive can be applied through an adhesive application system (e.g., the adhesive application system 400) after the reinforcement elements have been positioned within the fuselage. In various examples, to apply the adhesive, a seal can be formed at the coupling of the adhesive application system to the channel openings of the fuselage segment. One or more adhesive reservoirs can be coupled to the openings so that the reservoirs are in fluid communication with the coupling-element receiving channels and/or the torsion-element receiving channels. With the reservoirs coupled to the openings, a pressure differential can be applied over the fuselage segment (e.g., by applying a pressure differential between a first channel opening and the second channel opening), which can effectively distribute the adhesive along a length of the outer wall of the reinforcement elements along a length of the reinforcement elements to produce better bonding of the reinforcement elements to the component.

This disclosure is not intended to be exhaustive or to limit the present technology to the precise forms disclosed herein. For instance, although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Furthermore, although steps of methods may be presented herein in a particular order, in alternative embodiments the steps may have another suitable order, including being performed concurrently in a parallel process when possible.

Certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. The embodiments have been particularly shown and described, but it will be understood that various changes in form and details may be made. For example, although various embodiments have been described as having particular features and/or combinations of components, other embodiments are possible having any combination or sub-combination of any features and/or components from any of the embodiments described herein. The specific configurations of the various components can also be varied. For example, the size and specific shape of the various components can be different than the embodiments shown, while still providing the functions as described herein. Furthermore, in some examples, the illustrations describing some embodiments can hide particular features of the embodiment so as to not obscure the illustration of other features within the embodiment. Accordingly, this disclosure and associated technology can encompass other embodiments not expressly shown and/or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments. Where appropriate, relative terms, such as "about," "substantially," and "approximately," can be understood to incorporate standard tolerances. For example, two members that are "substantially parallel" may be understood to mean two members that are parallel within standard engineering tolerances.

I claim:

1. A method of assembling an additive manufactured airframe structure, comprising:
    inserting, into a torsion-element receiving channel of each of a plurality of segments of an airframe structure, a torsion reinforcement element, wherein the torsion-element receiving channel extends within an outer wall of the segment at a nonzero angle to a longitudinal axis of the segment, wherein the torsion-element receiving channel extends from a first torsion-channel opening at a first end of the outer wall to a second torsion-channel opening at a second end of the outer wall, and wherein the torsion-element receiving channel includes one or more grooves formed along a length of the torsion-element receiving channel;
    aligning the plurality of segments along the longitudinal axis such that coupling-element receiving channels formed within the outer wall of each segment are aligned, wherein the coupling-element receiving channels extend parallel to the longitudinal axis;
    inserting a coupling reinforcement element through the aligned coupling-element receiving channels to assemble the additive manufactured airframe structure; and
    applying an adhesive to an outer surface of the torsion reinforcement element, including applying a pressure differential between the first torsion-channel opening and the second torsion-channel opening, wherein applying the pressure differential includes distributing the adhesive along the grooves to the outer surface of the torsion reinforcement element, and wherein the pressure differential distributes the adhesive along the outer surface of the torsion reinforcement element.

2. The method of claim 1, further comprising printing, using an additive manufacturing process, the plurality of segments of the airframe structure.

3. The method of claim 1, further comprising inserting a tab between the torsion reinforcement element and the coupling reinforcement element.

4. The method of claim 1, further comprising applying an adhesive to an outer surface of the torsion reinforcement element.

5. The method of claim 4, wherein the step of applying the adhesive is performed after the step of inserting the coupling reinforcement element through the aligned coupling-element receiving channels.

6. The method of claim 5, wherein the aligned coupling-element receiving channels extend in fluid communication from a first opening at a first end of the aligned plurality of segments to a second opening at a second end of the aligned plurality of segments, wherein applying the adhesive to the outer surface of the coupling reinforcement element includes applying a pressure differential between the first opening and the second opening, and wherein the pressure differential distributes the adhesive along the outer surface of the coupling reinforcement element.

7. The method of claim 1, wherein inserting the torsion reinforcement element includes inserting the torsion reinforcement element through the first torsion-channel opening, wherein inserting the coupling reinforcement element includes inserting the coupling reinforcement element through a first coupling-channel opening at the first end of the outer wall of each segment, and wherein the first torsion-channel opening is in fluid communication with the first coupling-channel opening.

8. The method of claim 1, wherein inserting the torsion reinforcement element includes inserting the torsion reinforcement element through the first torsion-channel opening, wherein inserting the coupling reinforcement element includes inserting the coupling reinforcement element through a first coupling-channel opening at the first end of the outer wall of each segment, and wherein the first torsion-channel opening is spaced apart from the first coupling-channel opening at the first end of the outer wall.

9. The method of claim 1, wherein aligning the plurality of segments along the longitudinal axis also includes aligning second coupling-element receiving channels formed within the outer wall of each segment, wherein the second coupling-element receiving channels extend parallel to the longitudinal axis, and wherein the method further comprises inserting a second coupling reinforcement element through the aligned second coupling-element receiving channels.

10. The method of claim 9, wherein inserting the torsion reinforcement element includes inserting the torsion reinforcement element between the coupling-element receiving channel and the second coupling-element receiving channel.

11. The method of claim 1, wherein inserting the torsion reinforcement element into each of the segments includes arranging the torsion reinforcement element in each of the segments into a spiral pattern along the longitudinal axis.

12. The method of claim 1, wherein inserting the torsion reinforcement element includes:
inserting the torsion reinforcement element into the torsion-element receiving channel of a first of the segments at the nonzero angle having a first sign; and
inserting the torsion reinforcement element into the torsion-element receiving channel of a second of the segments at the nonzero angle having a second sign opposite to the first sign.

13. The method of claim 1, wherein inserting the torsion reinforcement element into each segment includes inserting the torsion reinforcement element through the first torsion-channel opening, and wherein the method further comprises inserting, through a second torsion-channel opening at a second end of the outer wall of each segment and into a second torsion-element receiving channel of each of the segments, a second torsion reinforcement element.

14. A method of assembling an additive manufactured airframe structure, comprising:
inserting, into a torsion-element receiving channel of each of a plurality of segments of an airframe structure, a torsion reinforcement element, wherein the torsion-element receiving channel extends within an outer wall of the segment at a nonzero angle to a longitudinal axis of the segment;
aligning the plurality of segments along the longitudinal axis such that coupling-element receiving channels formed within the outer wall of each segment are aligned, wherein the coupling-element receiving channels extend parallel to the longitudinal axis, and wherein the aligned coupling-element receiving channels extend in fluid communication from a first opening at a first end of the aligned plurality of segments to a second opening at a second end of the aligned plurality of segments;
inserting a coupling reinforcement element through the aligned coupling-element receiving channels to assemble the additive manufactured airframe structure; and
applying, after the step of inserting the coupling reinforcement element through the aligned coupling-element receiving channels, an adhesive to an outer surface of the coupling reinforcement element, including applying a pressure differential between the first opening and the second opening, wherein the coupling-element receiving channels include one or more grooves formed along a length of the coupling-element receiving channels, wherein applying the pressure differential includes distributing the adhesive along the grooves to the outer surface of the coupling reinforcement element, and wherein the pressure differential distributes the adhesive along the outer surface of the coupling reinforcement element.

15. The method of claim 14, further comprising applying an adhesive to an outer surface of the torsion reinforcement element.

16. The method of claim 15, wherein the step of applying the adhesive to the outer surface of the torsion reinforcement element is performed after the torsion reinforcement element is inserted through the torsion-element receiving channel.

17. The method of claim 15, wherein the torsion-element receiving channel extends from a first torsion-channel opening at a first end of the outer wall to a second torsion-channel opening at a second end of the outer wall, wherein applying the adhesive to the outer surface of the torsion reinforcement element includes applying a pressure differential between the first torsion-channel opening and the second torsion-channel opening, and wherein the pressure differential distributes the adhesive along the outer surface of the torsion reinforcement element.

* * * * *